United States Patent [19]
Silla

[11] Patent Number: 5,555,379
[45] Date of Patent: Sep. 10, 1996

[54] CACHE CONTROLLER INDEX ADDRESS GENERATOR

[75] Inventor: Mark Silla, Round Rock, Tex.

[73] Assignee: Advanced Micro Devices, Inc., Sunnyvale, Calif.

[21] Appl. No.: 271,105

[22] Filed: Jul. 6, 1994

[51] Int. Cl.$^6$ .................................................. G06F 13/00
[52] U.S. Cl. .................... 395/250; 364/964.2; 364/243.4
[58] Field of Search ...................................... 395/427, 375, 395/250

[56] References Cited

U.S. PATENT DOCUMENTS

| | | | |
|---|---|---|---|
| 4,141,067 | 2/1979 | McLagan | 395/425 |
| 4,394,732 | 7/1983 | Swenson | 395/425 |
| 4,463,420 | 7/1984 | Fletcher | 395/425 |
| 4,953,079 | 8/1990 | Ward et al. | 395/425 |
| 5,140,690 | 8/1992 | Hata et al. | 395/575 |
| 5,224,217 | 6/1993 | Zangenehpour | 395/425 |
| 5,394,531 | 2/1995 | Smith | 395/425 |

*Primary Examiner*—David Y. Eng
*Attorney, Agent, or Firm*—H. Dale Langley, Jr.

[57] ABSTRACT

The invention is a device for determining an address of a modified line in a cache memory and retrieving a tag, a data, and a corresponding associativity to execute a copyback routine to an external memory for the modified line. The cache memory includes an attribute array, a tag array, and a data array. The device includes a priority lookahead encoder logic circuit which simultaneously checks a status bit in each line of the attribute array to determine whether one or more modified lines are indicated. The priority lookahead encoder logic circuit then prioritizes the modified lines, if more than one is detected, for purposes of a copyback routine writing the modified lines to external memory. The device then generates an address of external memory which corresponds to each of the modified lines as and when each becomes next in priority for copyback. Finally, the device retrieves and holds data which corresponds to each of the modified lines for copyback.

12 Claims, 2 Drawing Sheets

CACHE CONTROLLER INDEX ADDRESS GENERATOR

CROSS-REFERENCE TO RELATED APPLICATIONS

This application is related to U.S. patent application Ser. No. 08/271,373 (18799.44; TT0239), titled PRIORITY LOOKAHEAD ENCODER WITH ASSOCIATIVITY DETERMINATION LOGIC, of the same inventor. The related application is filed on even date herewith, is assigned to the assignee of the present invention, and is hereby incorporated herein in its entirety by this reference thereto.

BACKGROUND OF THE INVENTION

1. Field of the Invention

The invention relates generally to cache memories in computers and, more particularly, to a device and method for determining the address of a modified line in a cache memory and retrieving the tag address, data, and corresponding associativity to execute a copyback routine for the modified cache line.

2. Description of the Related Art

Cache memories in computers and other digital processing devices are generally known. A cache is a memory allotment provided for storage, usually temporary, of data which may or may not be later accessed or permanently stored. Cache memories serve to hold data most often requested by an associated processor in order to speed-up fetch and store times. Cache is thus fast memory, and so is often used in devices to optimize processor performance and enhance bus bandwidth.

Cache memories, in effect, serve to reduce the average memory access time of devices. By reducing that time, cache speeds processing by eliminating the need to access external memory which is usually larger and for which access times are much less. By locating the cache close to the processor and equipping the cache with desirable accessing and storing procedures, cache can significantly speed operation of a processing device. As may be anticipated, many factors impact the effectiveness of cache, for example, cache size, physical organization, cache line replacement/modification algorithms, and the behavior of any software being run which employs the cache memory.

In typical operation, the cache maintains a copy of the most recently used code or data from the main (or "external") memory. This code or data in cache is what is used by the processor in its iterative operations. Main memory, i.e., external memory, is employed for permanent (or extended) data storage and is typically not accessed directly by the processor. Because the processor operates with data from cache memory, data stored in the cache from time to time must be identical to the data stored in external memory. When the cache memory is modified in a desired manner during processor operation, the data in the external memory must be updated as well.

There are a number of known procedures and devices for determining modifications of cache memory and writing modified data to external memory. These procedures and their effectiveness are generally dependent upon cache organization and the other factors previously described with respect to cache effectiveness. Regardless of organization and other factors, however, prior procedures for determining modifications of cache and writing cache modifications to external memory have required a stepped check through each location of stored information in the cache to determine at each location whether there has been any modification of cached data. Only when a modification is found in that stepped check is the external memory updated. Because cache memory is being replaced continually during the operation of a processor, these prior procedures of stepping through every piece of information stored in the cache until a modification is found are time consuming relative to processor operations. It would, therefore, be an advantage over the prior art if new devices and procedures were developed for identifying modifications of cache and updating external memory to reflect those modifications, which devices and procedures would allow reduced cache memory operation times.

In discussion of cache memories, a number of particular terms are often used. For a better understanding of the objects and advantages of the present invention, definitions are provided here for certain of those terms as follows:

Associativity—a number which refers to the number of possible locations in the cache based on cache organization in which a specific address may be cached. It also refers to the number of tags which are read and compared concurrently.

Clean line—a cache line that is not marked as modified because it is not written to main memory in a copyback write policy. The fact that such a cache line is not marked as modified indicates that the line is not modified relative to the relevant main memory.

Copyback—a write policy in which a write-back is performed in the cache when data is modified within the cache. When cached data is modified, the cache is flushed. When flushed, the data in the line or lines of the cache then marked as modified is written (copied back) to the main memory.

Data array—a random access memory array that contains the data variables for use by a processor.

Data cache—a cache which is used for caching frequently used processor data variables.

Index—each cache line has an index associated with it that must be stored and compared against the index of the memory request. Indexes are kept as entries (one per line) in a directory that establishes the correspondence between the data in the cache and the particular fragment of main memory that is represented.

Line (or Block)—a cache line or block is a group of sequential words in cache memory associated with a tag.

Look-up—a look-up is performed when some data is pulled from the main memory and placed in the cache.

Modified line—a cache line is marked as modified when it is written in a copyback write policy. The mark indicates that the line contains the most recent version of the data.

Status Bits—a status bit is associated with each cache line and indicates the modified or unmodified status of the line.

Tag—the tag identifies the address of the data or instruction which is currently present in the cache. A cache tag is associated with each cache line and is stored in the tag array.

Tag array—a random access memory array that contains the address tags for cache data.

The present invention is a cache controller index address generator that provides an improved apparatus and method for determination of the address of a modified line in a cache memory and retrieval of the tag address, data, and corresponding associativity of that line in order to execute a copyback routine for the modified cache line. In practice, the invention provides a faster type of flush mechanism for a cache memory and allows for speeded cache memory operations. Thus, the invention is a significant improvement in the art.

SUMMARY OF THE INVENTION

One embodiment of the invention is a device for identifying a modified line in a cache memory and writing the modified line to an external memory. The device comprises a detector for simultaneously determining all modifications of the cache memory, a prioritizer for prioritizing the modifications for purposes of sequentially writing the modifications to the external memory, and identifier for identifying an address in the external memory to which each the modification is to be written.

In another aspect, the cache memory includes an attribute array, a tag array, and a data array.

In yet another aspect, the detector is a logic circuit that simultaneously checks a status bit of each line of the attribute array in order to determine the modifications.

In a further aspect, the prioritizer is a logic circuit that sequentially outputs, according to a desired prioritizing scheme inherent in the design of the logic circuit, an associativity signal and an index signal each corresponding to each of the modifications.

In yet another aspect, the prioritizer is a logic circuit that sequentially outputs, according to a desired prioritizing scheme inherent in the design of the logic circuit, an associativity signal and an index signal each corresponding to each of the modifications.

In even another aspect, the identifier includes a determiner utilizing the index signal and the associativity signal to determine from the tag array a tag signal for combination with the index signal to yield the address.

In another further aspect, a data signal corresponding to an associativity of the modified index line is produced by a second mux, the index signal determining locations in the data array of possible data signals, the associativity signal being input to the second mux in order to select the applicable cache line, and the second mux yielding the data signal.

In even a further aspect, the detector is a logic circuit that simultaneously checks a status bit of each line of the attribute array in order to determine the modifications.

In a further aspect, the identifier includes a first mux, the index signal determining locations in the tag array of possible tag signals, the associativity signal being input to the first mux in order to select the applicable tag address, and the first mux yielding a tag signal.

In a further aspect, the device further comprises a copyback buffer, the data signal being stored in the copyback buffer for writing to the external memory.

Another embodiment of the invention is a device for determining an address of a modified line in a cache memory and retrieving a tag, a data, and a corresponding associativity to execute a copyback routine to an external memory for the modified line, the cache memory including an attribute array, a tag array, and a data array. The device comprises a checker for simultaneously checking a status bit in each line of the attribute array to determine whether one or more of the modified lines is indicated, a prioritizer for prioritizing the modified lines when more than one, a generator for generating an address of the external memory corresponding to each of the modified lines as and when each of the modified lines becomes next in priority, and retriever for retrieving each of the data which corresponds to each of the modified lines as and when each of the modified lines becomes next in priority.

In another aspect, the checker is a priority lookahead encoder.

In a further aspect, the generator includes a first mux, the first mux receives inputs of an associativity signal from the priority lookahead encoder and several possible tags from the tag array determined by an index signal from the priority lookahead encoder, the first mux yielding the tag, the tag being combined with the index signal to give the address.

In even another aspect, the retriever includes a second mux, the second mux receives inputs of the associativity signal and selects from several possible data from the data array determined by the index signal, the second mux yielding the data.

In even a further aspect, the device further comprises storage for storing the data for performing the copyback routine.

In another aspect, the storage is a copyback buffer.

Yet another embodiment of the invention is a method of determining an address of a modified line in a cache memory and retrieving a tag, a data, and a corresponding associativity to execute a copyback routine to an external memory for the modified line, the cache memory including an attribute array, a tag array, and a data array. The method comprises the steps of checking, simultaneously, a status bit in each line of the attribute array to determine whether one or more of the modified lines is indicated, prioritizing the modified lines when more than one, generating an address of the external memory corresponding to each of the modified lines as and when each of the modified lines becomes next in priority, and retrieving each of the data which corresponds to each of the modified lines as and when each of the modified lines becomes next in priority.

In another aspect, the steps of checking and prioritizing are performed by a priority lookahead encoder logic circuit.

In yet another aspect, the step of generating is performed by a first mux, the first mux receives inputs of an associativity signal from the priority lookahead encoder and selects from several possible tags from the tag array determined by an index signal from the priority lookahead encoder logic circuit, the first mux yielding the tag, the tag being combined with the index signal to give the address.

In even another aspect, the step of retrieving is performed by a second mux, the second mux receives inputs of the associativity signal and selects from several possible data from the data array determined by the index signal, the second mux yielding the data.

In a further aspect, the method further comprises the step of storing the data in a copyback buffer for use in the copyback routine.

BRIEF DESCRIPTION OF THE DRAWINGS

For a more detailed understanding of the present invention and for further objects and advantages thereof, reference may now be had to the following description taken in conjunction with the accompanying drawings, in which.

DETAILED DESCRIPTION OF THE INVENTION

Figure 1:
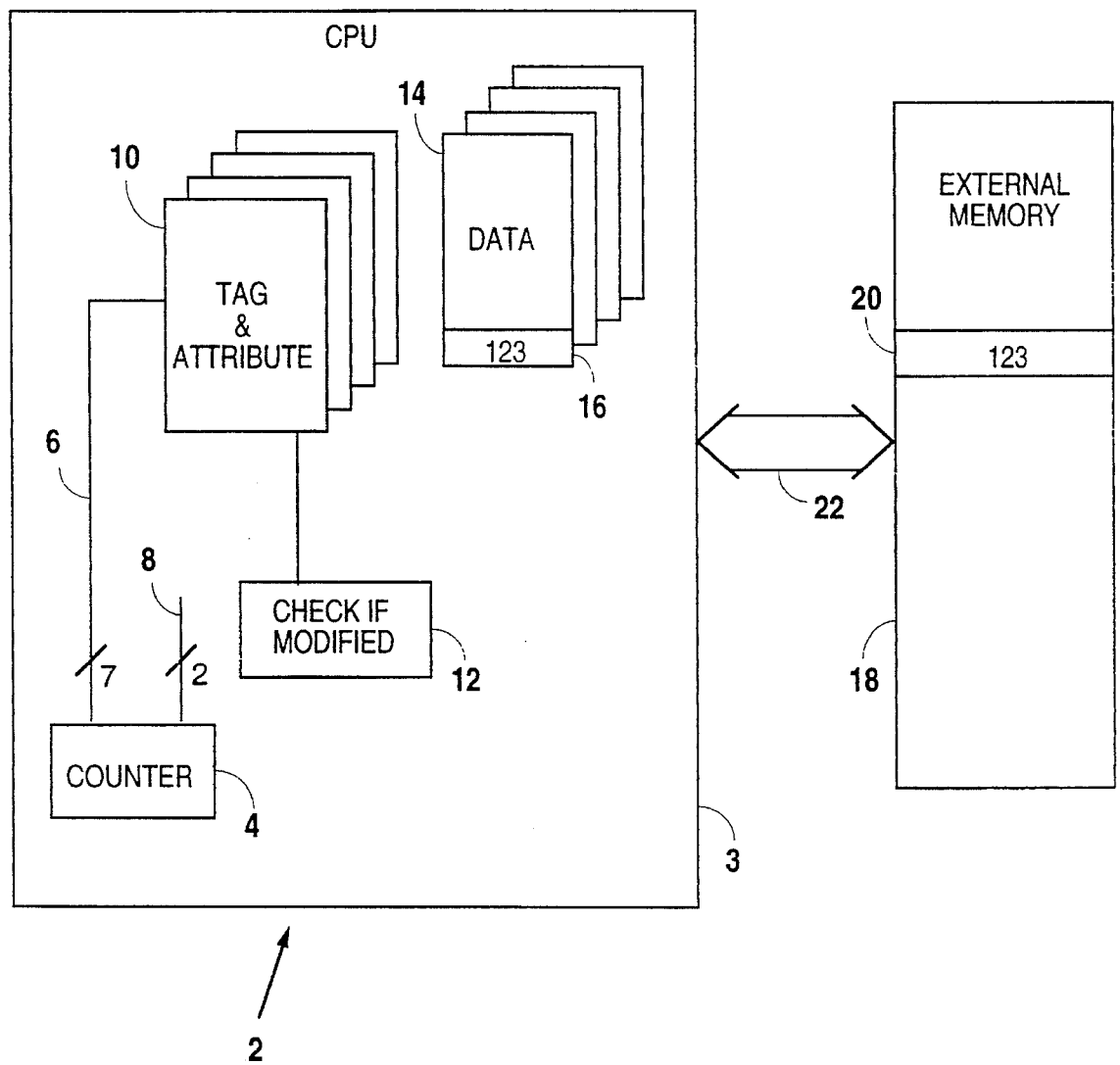
FIG. 1 is a simplified, block illustration of a prior art cache accessing and copyback process and apparatus.

Referring first to FIG. 1, a prior art cache memory addressing and copyback apparatus 2 is illustrated. This prior apparatus 2 consists of a central processing unit ("CPU") 3 and certain external memory 18. The CPU 3 includes a data array 14 and a tag and attribute array 10.

Still referring to FIG. 1, the data array 14 of this prior art cache memory apparatus 2 contains a number of memory locations, for example, 512 if a four-layer array each having 128 lines of cache data. Such a data array 14 is typically employed in this arrangement for storing processor data variables frequently used by the CPU 3 of the device during iterative operations. The data array 14 holds the variable values for ready access and manipulation by the CPU 3.

Continuing to refer to FIG. 1, the tag and attribute array 10 is a cache which is used for storing identifying data relevant to the addressing of information stored in the data cache 14. The particular identifying data stored in the tag and attribute array 10 can be of a variety of forms depending upon the particular type of addressing technique employed with the cache memory 2. In a typical type of addressing technique, the tag and attribute array 10 contains an indicator of status of data at each particular location in the data array 14 (i.e., whether modified or unmodified) and a respective location address for that data in the data array 14.

Still continuing to refer to FIG. 1, the CPU 3 also includes a counter 4 mechanism. The counter 4 serves to step processing through each of the address tags stored in the tag and attribute array 10 when accessing data of the data array 14. The counter signal 6 directs the check if modified mechanism 12 to look at a particular line of the tag and attribute array 10. The point signal 8 directs the counter 4 to point, respectively, to each of the four layers of the tag and attribute array 10 so that the counter signal 6 may cause the check if modified mechanism 12 to check each line of each of the layers. The check if modified mechanism 12 of the CPU 3 serves to check for a modification in each location of the tag and attribute array 10 as the counter 4 steps through those locations.

Still referring to FIG. 1, operation of the prior art cache memory addressing and copyback apparatus 2 may be understood. For exemplary purposes, consider that each of the tag and attribute array 10 and the data array 14 are four layer and have 128 lines per layer. The counter signal 6, is then, for example, a 7-bit signal, which corresponds to the 128 locations of each layer of the tag and attribute array 10. The point signal 8 may be, for example, a 2-bit signal, which causes the check if modified mechanism 12 to look at a particular one of the four layers while the counter signal 6 causes the check if modified mechanism 12 to step through each line of that layer. Once all locations of a particular layer are checked for modification, the point signal 8 causes the check if modified mechanism 12 to look at the next successive layer, and so on until a modification is found or, if no modification, then, until each location of the entire tag and attribute array 10 has been checked.

Further referring to FIG. 1, the counter 4, in this prior art apparatus 2, must step the check if modified mechanism 12 through each memory location of the tag and attribute array 10, one by one, and check each such location to determine whether the particular, relevant line of the tag and attribute array 10 has been modified. In this exemplary prior art apparatus 2 described herein, this may require the check if modified mechanism 12 to look-up and check up to 512 sequences each time cache memory is to be checked for a modification. Even if a modified line is found and an address determined and copyback routine exercised, the check if modified mechanism 12 must again be stepped through each memory location of the tag and attribute array 10 to determine the next or later modified line. As may be readily appreciated, stepping a check mechanism 12 through each of some 512 possible cache lines each time a modification must be determined is time consuming in terms of processor speed. The speed of cache memory modification addressing and copyback becomes even more important as cache memory size increases in devices. It will be understood by those in the art that the 8K arrays 10,14 described here are intended only as exemplary and that the problem addressed by the present invention is found in all cache memories.

Figure 2:
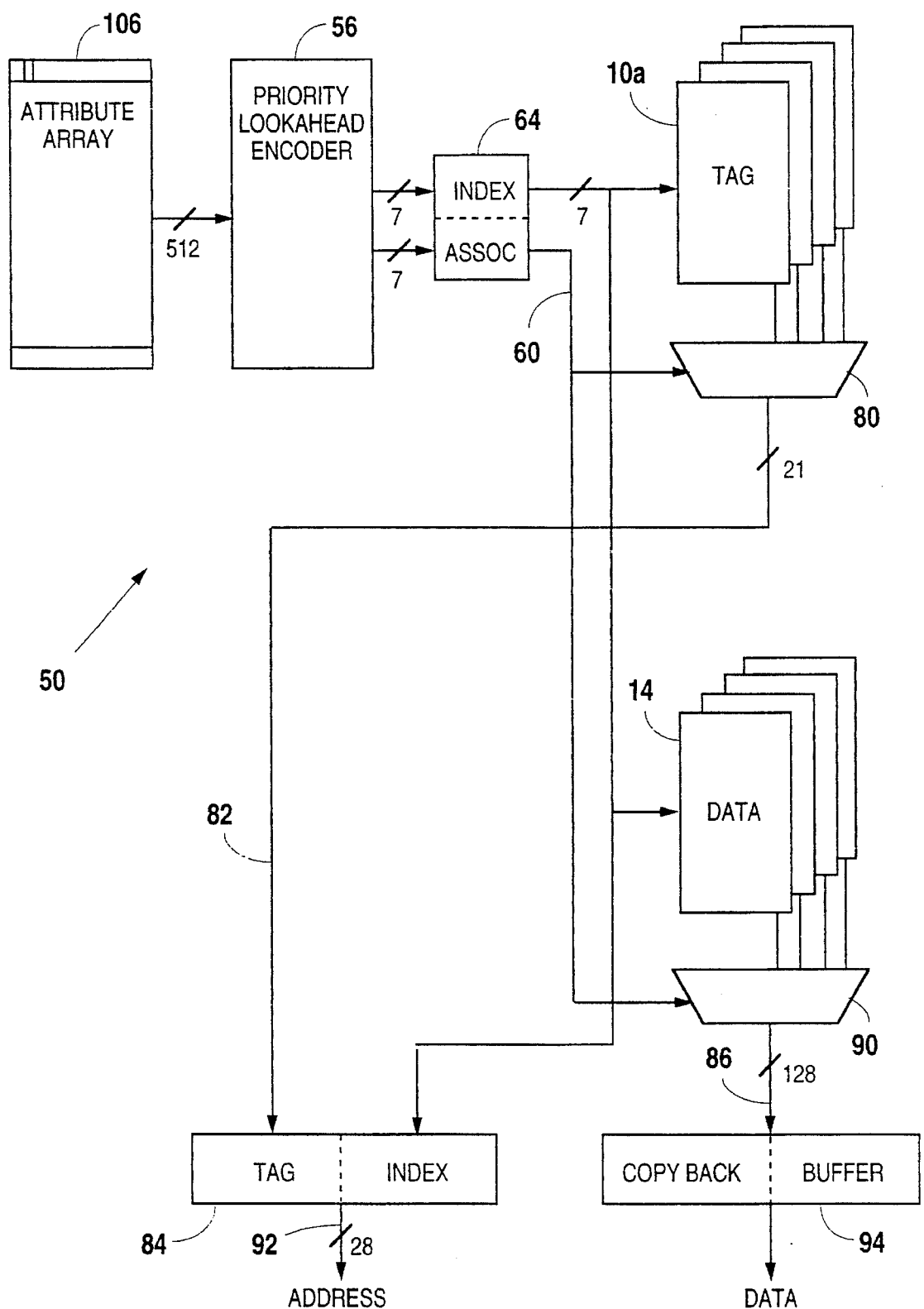
FIG. 2 is a simplified, block illustration of the cache controller index address generator of the present invention, showing the improved apparatus and method for determining the address of a modified line in a cache memory and retrieving the tag address, data, and corresponding associativity of that line in order to execute a copyback routine, which apparatus and method employ and incorporate a priority encoder mechanism.

Now referring to FIG. 2, the present cache controller index address generator 50 of the present invention is illustrated. As will be hereinafter more fully understood, this cache controller index address generator 50 speeds determination of the address of a modified line in a cache memory and retrieval of the tag address, data, and corresponding associativity of that line in order to execute a copyback routine for the modified cache line. In general concept, the generator 50 simultaneously looks at a specified bit of each line of the attribute array 10b indicative of status of the line (i.e., modified or unmodified) and provides a scheme to prioritize copyback of modified lines when more than one modified line is indicated.

Still referring to FIG. 2, like elements in FIGS. 1 and 2 are identified by the same numbers. As in the prior art cache memory addressing and copyback apparatus 2 of FIG. 1, the present cache controller index address generator 50 includes tag and attribute arrays 10a,10b (identified separately here in FIG. 2) and a data array 14. The cache controller index address generator 50 operates on those attribute and tag arrays 10b,10a to directly determine lines of the data array 14 which are modified and the tag, attribute, and corresponding associativity of those modified lines.

Continuing to refer to FIG. 2, a priority lookahead encoder 56 simultaneously checks a particular status of each line of the attribute array 10b. A status bit, as previously defined, is associated with each memory location or cache line and indicates the modified or unmodified field status of the location. If the status bit of any line (or lines) of the attribute array 10b indicates a modification of cached data, i.e., a modified line in the data array 14, then that signals the priority lookahead encoder 56 to prioritize modifications (if more than one) and cause the cache memory to perform copyback routines to write the modified data to external memory.

Further referring to FIG. 2, the priority lookahead encoder 56 is preferably a logic circuit which simultaneously looks only at each status bit of each line of the attribute array 10b. By looking at each status bit of each such line in that manner, the priority lookahead encoder 56 detects any modification(s) indicated by status bit(s). The priority lookahead encoder 56 logic circuitry also preferably serves to prioritize the modifications detected, if more than one, for purposes of copyback to external memory. Though the description herein is of the preferred priority lookahead encoder 56 mechanism, the mechanism may alternatively perform only certain of those functions, with other devices or mechanisms performing the functions not performed by the priority lookahead encoder 56. As another alternative, the priority lookahead encoder 56 could check status bits of only a portion, but not all, of the lines of the attribute array 10b, simultaneously; in that event, the priority lookahead encoder 56 could provide alternative or additional prioritizing arrangements since multiple determinations would be necessary for a single look at all cache locations for determining modifications. As will be apparent to those skilled in the art, additional, further, alternative and combinational modifications of the priority lookahead encoder 56 may be possible.

Still referring to FIG. 2, in the preferred embodiment of the cache controller index address generator 50, the priority lookahead encoder 56, upon detecting one or more status bits of the attribute array 10b indicating modified lines of the data array 14, yields two signals: an associativity signal 60 and an index signal 58 indicative of the associativity and index, respectively, of a modified line of the data array given priority. It should be noted that the priority lookahead encoder 56 may simultaneously detect more than one status bit of the attribute array 10b indicating modification. This is the case when there is more than one modified line of the data array 14. In fact, there will at any point in time be one status bit indicating modification for each line of the data array 14 which is then modified. Because the priority lookahead encoder 56 may so simultaneously detect several status bits indicating modification, the generator 50 must, in some manner, prioritize the several modifications for purposes of performing copyback. As previously discussed, the priority lookahead encoder 56 of the cache controller index address generator 50 performs that function in the preferred embodiment. The associativity signal 60 and the index signal 58 will first correspond with the modification given first priority, will second correspond with the modification given second priority, and so on until the associativity signal 60 and index signal 58 corresponding to each modification detected in the modification check by the priority lookahead encoder 56 is passed from the priority lookahead encoder 56.

Continuing still to refer to FIG. 2, as each associativity signal 60 and index signal 58 relative to each particular modification detected is passed from the priority lookahead encoder 56, the signals 60,58 are stored in an associativity/ index register 64. This associativity/index register 64 is a temporary data storage register which allows each successive associativity signal 60 and index signal 58 corresponding to modified lines of the data array 14 to be processed according to the priority established by the priority lookahead encoder 56.

Further referring to FIG. 2, the associativity signal 60 passes from the associativity/index register 64 to a first mux 80 and a second mux 90. The index signal 58, on the other hand, passes from the associativity/index register 64 to a tag array 10a and a tag/index register 84 for storage. The tag/index register 84 is a temporary data storage register which holds the index signal 58 during processing of a particular associativity signal 60 and index signal 58 from the priority lookahead encoder 56. The tag/index register 84 also holds a tag signal 82 which will hereinafter be discussed more fully.

Referring further to FIG. 2, the index signal 58 passed to the tag array 10a performs a look-up on all four layers of the tag array 10a to find the index in the tag array 10a indicated by the index signal 58. The particular associativity is then selected by the mux 80, which mux 80 receives the associativity signal 60 passed to the associativity/index register 64 by the priority lookahead encoder 56. In effect, the mux 80 receives the associativity signal 60 which indicates the desired associativity in order to select from the four indexes of the tag array 10a corresponding to the index signal 58 to the tag array 10a. The mux 80 selects from the memory locations of the four layers identified, and yields the tag signal 82. As previously mentioned, the tag/index register 84 stores the tag signal 82 and index signal 60.

Further, still referring to FIG. 2, the index signal 58 is likewise passed to the data array 14. That index signal 58 passed to the data array 14 performs a look-up on all four layers of the data array 14 to find the index in the data array 14 indicated by the index signal 58. The particular associativity is then selected by the mux 90, which mux 90 receives the associativity signal 60 passed to the associativity/index register 64 by the priority lookahead encoder 56. This process, like that in the first mux 80, is basically a cache data look-up which selects which way, i.e., which associativity, is to be sent out for direction to external memory. The mux 90 selects from the memory locations of the four layers identified, yielding a data signal 86. The data signal 86 is directed to a copyback buffer 94 for storage during performance of a copyback routine.

Referring still to FIG. 2, the tag/index register 84 makes available the address 92, indicative of the location in external memory at which particular data 86 then stored in the copyback buffer 94 is to be written. As described, the copyback buffer 94 stores the particular data 86 for performance of the copyback routine. In this manner, the generator 50 allows ready determination of modified cache memory lines and allows data from those modified lines to be written to external memory via some copyback routine. Clearly, the generator 50 and method thereof speed cache operation, eliminating the necessity of a stepped check through the cache for modifications.

Still referring to FIG. 2, operation of the cache controller index address generator 50 may be better understood by an example. For purposes of the example, consider that each of the attribute array 10b, the tag array 10a, and the data array 14 are four layer and have 128 lines per layer, that is, each array 10b,10a,14 is 512 kilobytes of memory. The priority lookahead encoder 56 simultaneously detects a single bit, i.e., the status bit, of each line of each of the four layers and so detects 512 bits simultaneously (this is indicated in FIG. 2 by signal 54). Upon detecting one or more of the 512 status bits indicating modifications of lines of memory, the priority lookahead encoder 56 prioritizes the detected modifications, if more than one. The priority lookahead encoder 56 then successively, in the order prioritized, transmits a 7-bit index signal 58 and a 7-bit associativity signal 60 corresponding to the line in which each status bit indicating modification was found. Each of these 7-bit signals 58,60 are held in the associativity/index register 64. Additionally, the 7-bit associativity signal 60 is passed to the first mux 80 and the second mux 90 and the 7-bit index signal 58 is passed to the tag array 10a and the data array 14. A look-up is performed in each array 10a,10b to yield tag and data information, respectively, corresponding to the particular index signal 58. Each mux 80,90 selects, based on the associativity signal 60 inputs, a particular tag transmitted as a tag signal 21 and a particular data transmitted as a data signal 86. The tag signal 21 is 21-bits in this example. The data signal 86 is 128-bits in the example. The tag signal 21 and index signal 58 are combined in the tag/index register 84 to give a 28-bit address 92 for a copyback routine in writing the modification to external memory (not shown in FIG. 2). The data signal 86 is stored in the copyback buffer to give a 28-bit data for the copyback routine.

As is clearly seen, the present invention overcomes the problems presented by the prior art devices and methods.

The present invention is believed to be especially effective when configured and employed as described herein, however, those skilled in the art will readily recognize that numerous variations and substitutions may be made in the device and its use and configuration to achieve substantially the same results as achieved by the embodiments and, in particular, the preferred embodiment expressly described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A device for identifying a modified line in a cache memory and writing said modified line to an external memory comprising:

detector for simultaneously determining all modifications of said cache memory;

prioritizer for prioritizing said modifications for purposes of sequentially writing said modifications to said external memory; and identifier for identifying an address in said external memory to which each said modification is to be written;

wherein said cache memory includes an attribute array, a tag array, and a data array;

wherein said prioritizer is a logic circuit that sequentially outputs, according to a desired prioritization, an associativity signal and an index signal each corresponding to each of said modifications;

wherein said identifier includes a determiner utilizing said index signal and said associativity signal to determine from said tag array a tag signal for combination with said index signal to yield said address.

2. The device of claim 1, wherein said detector is a logic circuit that simultaneously checks a status bit of each line of said attribute array in order to determine said modifications.

3. The device of claim 1, wherein said identifier includes a first mux, said index signal determining locations in said tag array of several possible tag signals, said associativity signal and said several possible tag signals being input along with said possible tag signals to said first mux, and said first mux yielding a desired tag signal.

4. A device for identifying a modified line in a cache memory and writing said modified line to an external memory, comprising:

detector for simultaneously determining all modifications of said cache memory;

prioritizer for prioritizing said modifications for purposes of sequentially writing said modifications to said external memory; and identifier for identifying an address in said external memory to which each said modification is to be written;

wherein said cache memory includes an attribute array a tag array and a data array;

wherein said prioritizer is a logic circuit that sequentially outputs, according to a desired prioritization, an associativity signal and an index signal each corresponding to each of said modifications;

further comprising a mux;

wherein a data signal corresponding to said modified line is produced by said mux, said index signal determining locations in said data array of several possible data signals, said associativity signal and said several possible data signals being input along with said possible data signals to said mux, and said mux yielding a desired data signal.

5. The device of claim 4, further comprising a copyback buffer, said data signal being stored in said copyback buffer for writing to said external memory.

6. A device for determining an address of a modified line in a cache memory and retrieving a tag, a data, and a corresponding associativity to execute a copyback routine to an external memory for said modified line, said cache memory including an attribute array, a tag array, and a data array, comprising:

checker for simultaneously checking a status bit in each line of said attribute array to determine whether one or more of said modified lines is indicated;

prioritizer for prioritizing said modified lines when more than one;

generator for generating an address of said external memory corresponding to each of said modified lines as and when each of said modified lines becomes next in priority; and retriever for retrieving each of said data which corresponds to each of said modified lines as and when each of said modified lines becomes next in priority;

wherein said checker is a priority lookahead encoder;

wherein said generator includes a first mux, said first mux receives inputs of an associativity signal from said priority lookahead encoder and several possible tags from said tag array determined by an index signal from said priority lookahead encoder, said first mux yielding a desired tag, said desired tag being combined with said index signal to give said address.

7. The device of claim 6, wherein said retriever includes a second mux, said second mux receives inputs of said associativity signal and several possible data from said data array determined by said index signal, said second mux yielding a desired data selected from said several possible data.

8. The device of claim 7, further comprising storage for storing said data for performing said copyback routine.

9. The device of claim 8, wherein said storage is a copyback buffer.

10. A method of determining an address of a modified line in a cache memory and retrieving a tag, a data, and a corresponding associativity to execute a copyback routine to an external memory for said modified line, said cache memory including an attribute array, a tag array, and a data arrays comprising the steps of:

checking, simultaneously, a status bit in each line of said attribute array to determine whether one or more of said modified lines is indicated;

prioritizing said modified lines when more than one;

generating an address of said external memory corresponding to each of said modified lines as and when each of said modified lines becomes next in priority; and retrieving each of said data which corresponds to each of said modified lines as and when each of said modified lines becomes next in priority;

wherein the steps of checking and prioritizing are performed by a priority lookahead encoder logic circuit;

wherein the step of generating is performed by a first mux, said first mux receives inputs of an associativity signal from said priority lookahead encoder and several possible tags from said tag array determined by an index signal from said priority lookahead encoder logic circuit, said first mux yielding a desired tag, said desired tag being combined with said index signal to give said address.

11. The method of claim 10, wherein the step of retrieving is performed by a second mux, said second mux receives inputs of said associativity signal and several possible data from said data array determined by said index signal, said second mux yielding a desired data.

12. The method of claim 11, further comprising the step of storing said desired data in a copyback buffer for use in said copyback routine.

* * * * *

UNITED STATES PATENT AND TRADEMARK OFFICE
CERTIFICATE OF CORRECTION

PATENT NO.    : 5,555,379
DATED         : September 10, 1996
INVENTOR(S)   : Silla It is certified that error appears in the above-identified patent and that said Letters Patent is hereby corrected as shown below:

Column 1,
Line 8, after "08/271,373" please delete "(18799.44; TT0239),".

Column 3,
Line 13, "each the" should read -- each of the --.
Line 14, "modification" should read -- modifications --.

Column 5,
Line 50, the first instance of "layer" should read -- layers --.

Column 6,
Line 52, "cause" should read -- causes --.

Column 9,
Line 57, "array a" should read -- array, a --.

Signed and Sealed this

Twenty-ninth Day of October, 2002

*Attest:*

JAMES E. ROGAN
*Attesting Officer*    *Director of the United States Patent and Trademark Office*